United States Patent [19]

Ito et al.

[11] Patent Number: 4,507,627

[45] Date of Patent: Mar. 26, 1985

[54] CATV SYSTEM

[75] Inventors: Katsuo Ito; Bunjiro Murata, both of Kanazawa; Kazunori Yoshimura, Sumiyoshi, all of Japan

[73] Assignee: Murata Manufacturing Co., Ltd., Japan

[21] Appl. No.: 448,372

[22] Filed: Dec. 9, 1982

[30] Foreign Application Priority Data

Dec. 12, 1981 [JP] Japan .............................. 56-200303
Dec. 28, 1981 [JP] Japan ........................ 56-197528[U]
Dec. 28, 1981 [JP] Japan ........................ 56-197529[U]

[51] Int. Cl.³ ............................................... H01F 1/10
[52] U.S. Cl. .................................. 333/105; 200/153 S; 200/305; 200/16 R; 200/16 D; 174/52 R
[58] Field of Search ............... 333/105, 101, 124, 125, 333/262, 32; 200/153 S, 304, 305, 16 D, 16 E, 16 F, 215, 16 R, 303; 338/199–201; 361/394, 424; 174/52 R, 59

[56] References Cited

U.S. PATENT DOCUMENTS

2,958,054 10/1960 Concelman ......................... 333/105
3,940,584 2/1976 Cauldwell et al. .............. 200/153 S
4,057,520 11/1977 Schwartz .......................... 200/16 D

Primary Examiner—Eugene R. LaRoche
Assistant Examiner—Benny T. Lee
Attorney, Agent, or Firm—Ostrolenk, Faber, Gerb & Soffen

[57] ABSTRACT

A CATV system comprises two coaxial cables (11, 12) for transmitting information obtained from a center unit, a slide switch (1), and a CATV converter (30). As a slider (73) of the slide switch is slided in one direction with the same in contact with a common contact (101) connected to the CATV converter, the slider is placed in contact with a first fixed contact (104) connected to one coaxial cable while a first terminating contact (110) connected to a first terminating resistor (13) is separated from the first fixed contact. When the slider is slided in the other direction, the slider is placed in contact with a second fixed contact (107) connected to the other coaxial cable, while a second terminating contact (111) connected to the second terminating resistor (14) is separated from the second fixed contact. Accordingly, each of the coaxial cables is not opened through selection of the slide switch, whereby mixing of an image is prevented from occurring due to mismatching.

9 Claims, 22 Drawing Figures

CATV SYSTEM

BACKGROUND OF THE INVENTION

1. Field of the Invention

The present invention relates to a CATV system. More specifically, the present invention relates to an improvement in a CATV system in which information is transmitted through a plurality of lines (coaxial cables) from a central unit and is selectively applied to a CATV converter.

2. Description of the Prior Art

A conventional CATV system comprises a central unit and terminals located at respective homes and coupled to the central unit by coaxial cables, in which information is transmitted unidirectionally or bidirectionally. Typically, one coaxial cable is used for transmission of information of a plurality of channels. However, there is a limit to the number of channels that can be transmitted by one coaxial cable due to the limit to the bandwidth of a coaxial cable. For example, assuming that information of 36 channels is to be transmitted, the maximum bandwidth frequency would become 300 MHz. Accordingly, in case where more channels are required, two or more coaxial cables are provided and means are provided for selectively coupling the coaxial cables, one at a time to a CATV converter.

Figure 1:
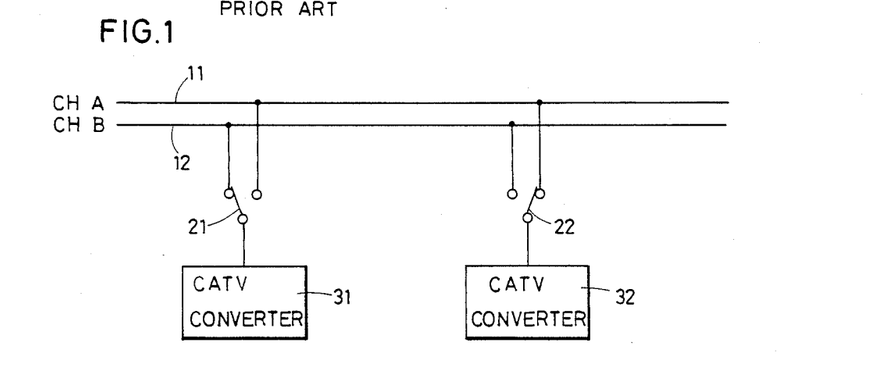
FIG. 1 is a view showing a cable selecting circuit in a CATV system of a plurality of coaxial cables which constitutes the background of the invention.

FIG. 1 is a view showing a cable selecting circuit in a CATV system using a pluralitly of coaxial cables which constitutes the background of the invention. Referring to the figure, two coaxial cables 11 and 12 are provided for transmission of information of a plurality of channels using signals of given frequencies, respectively. Selecting switches 21 and 22 are provided for selecting the coaxial cable 11 or 12. The selecting switch 21 is used for selecting a coaxial cable to be connected to a CATV converter 31 and the selecting switch 22 is provided for selecting the coaxial cable to be connected to a CATV converter 32. Now in the case where selection is made from the coaxial cable 11 to the coaxial cable 12 by the switch 21, it is necessary to avoid any undesired influence to be exerted upon the other CATV converter 32. More specifically, since the frequency of the signal to be transmitted by the coaxial cable is high, when selection is made from the coaxial cable 11 to the coaxial cable 12 by the switch 21 reflection occurs with the opened contact of the switch 21 serving as an opening end, whereby a standing wave arises in the coaxial cable 11.

If and when mismatching occurring at an opened terminal of the switch 21 is large or isolation is small when the coaxial cable 12 is connected to the CATV converter 31 through the switch 21 and the coaxial cable 11 is connected to the CATV converter 32 through the switch 22, leakage could arise between channels A and B or the impedance could change. Therefore, mismatching or mixing of an image could occur at the input of the CATV converter 32, with the result that an image of a good quality could not be obtained.

SUMMARY OF THE INVENTION

Accordingly, a principal object of the present invention is to provide a CATV system adapted for eliminating degradation of the quality of an image due to selection one of at least two lines through a selecting switch.

The present invention uses a terminating resistor having a predetermined impedance to terminate the non-selected line when the other line is selected by a selecting switch.

Therefore, according to the present invention, even if any one of at least two lines is selected by a selecting switch, the remaining lines are positively terminated by a terminating resistors without being opened at all and hence any mismatching due to an opened end can be eliminated and isolation between the respective lines can be increased. As a result, leakage of a signal between the lines can be prevented from occurring and the impedance can be prevented from changing, with the result that mixing of an image can be prevented from occurring and hence an image of an excellent quality can be attained.

In a preferred embodiment of the present invention, the interior of a shield case constituting a cover of a slide switch is partitioned into three compartments and a common contact normally in contact with the slider is housed in the middle compartment with the same connected to a terminal unit. A first fixed contact connected to one line and a first terminating contact in electrical contact with the first fixed contact and having the first terminating resistor connected thereto are housed in one of both end compartments. A second fixed contact connected to the remaining line and a second terminating contact in electrical contact with the second fixed contact and having the second terminating resistor connected thereto are housed in the other of both end compartments. When the slider is slided in one direction with the common contact normally in contact with the slider, the first fixed contact and the first terminating contact are released from contacting, whereby one line is connected to the terminal unit. Since the second terminating contact is placed in electrical contact with the second fixed contact due to the fact that the slider is slided in one direction, the other line is terminated by a second terminating resistor. On the other hand, when the slide is slided in the other direction, the second fixed contact and the second terminating contact are released from contacting, whereby the other line is connected to the terminal unit. Since the first terminating contact is placed in electrical contact with the first fixed contact at that time, one line is terminated by the first terminating resistor.

Therefore, according to a preferred embodiment of the present invention, any line can be selectively connected to the terminal unit through simple operation of only sliding the slider in one direction or the other direction, while the remaining line can be terminated.

In another embodiment of the present invention, a CATV converter for converting the frequency of a signal transmitted from a center unit is provided as a portion of a terminal unit and a selecting switch is housed in a housing of the CATV converter. As a result, it is not necessary to externally provide the selecting switch. Furthermore, by disposing the CATV converter in the vicinity of a television receiver, selection of lines can be made with relative ease.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
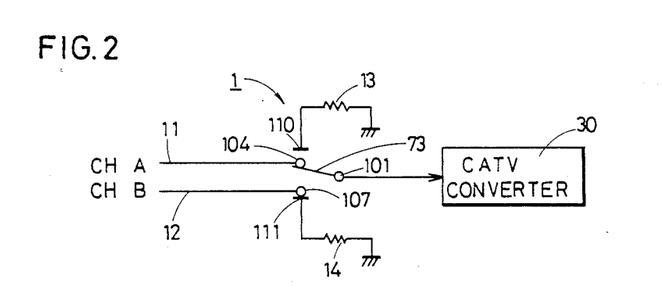
FIG. 2 is a schematic diagram of a slide switch included in one embodiment of the present invention.

FIG. 2 is a schematic diagram of a slide switch included in one embodiment of the present invention. First referring to FIG. 2, a principle of selecting the lines by means of a slide switch 1 will be briefly described. The slide switch 1 comprises a common contact 101, a first fixed contact 104, a second fixed contact 107, a first terminating contact 110, a second terminating contact 111, a movable contact 73, and two terminating resistors 13 and 14. The common contact 101 is coupled to a CATV converter 30, the first fixed contact 104 is coupled to a coaxial cable 11, and a second fixed contact 107 is coupled to a coaxial cable 12. The terminating contact 110 having one end of the terminating resistor 13 connected thereto is placed in contact with the first fixed contact 104 and the terminating contact 111 having one end of the terminating resistor 14 connected thereto is placed in contact with the second fixed contact 107. The other end of each of the terminating resistors 13 and 14 is connected to the ground. When the movable contact 73 is placed in contact with the first fixed contact 104, the terminating contact 110 is separated from the first fixed contact 104. On the other hand, the second fixed contact 107 is terminated by the terminating resistor 14. When the movable contact 73 is placed in contact with the second fixed contact 107 after separation from the first fixed contact 104, the first terminating contact 110 is placed in contact with the first fixed contact 104 and the second terminating contact 111 is separated from the second fixed contact 107. Accordingly, the first fixed contact 104, is then terminated by the terminating resistor 13. Meanwhile, in the case where the coaxial cables 11 and 12 have a characteristic impedance of 75Ω, terminating resistors 13 and 14 having an impedance of 75Ω are employed.

Figure 3A:
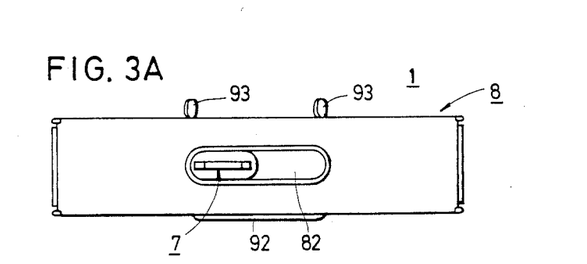
FIGS. 3A to 3E are views of a slide switch included in the embodiment of the present invention.
Figure 3B:
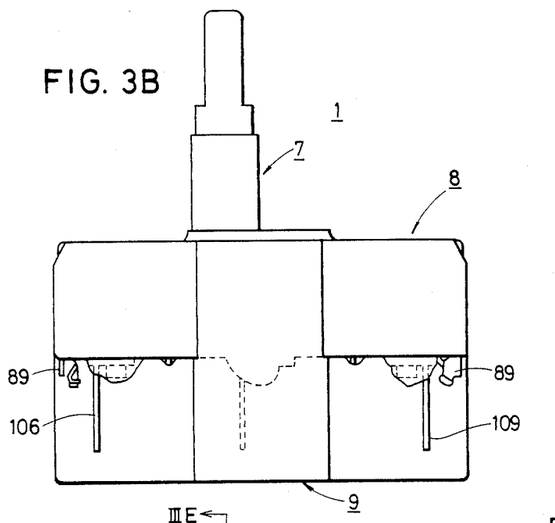
Figure 3C:
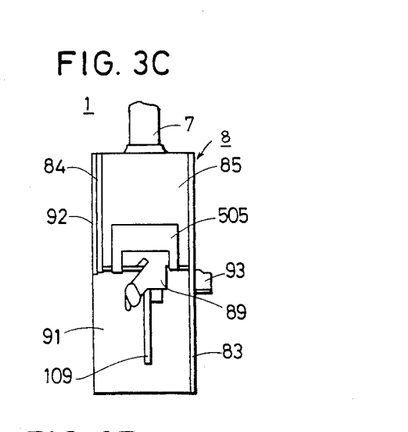
Figure 3D:
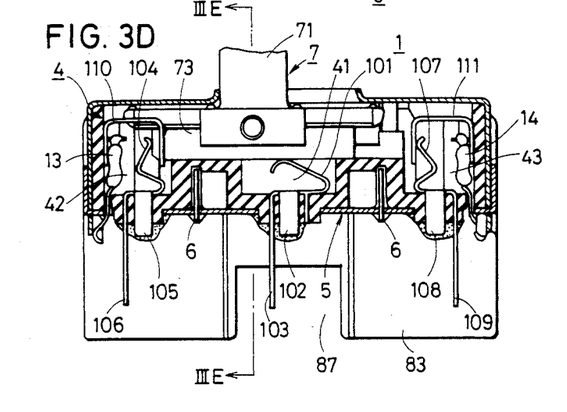
Figure 3E:
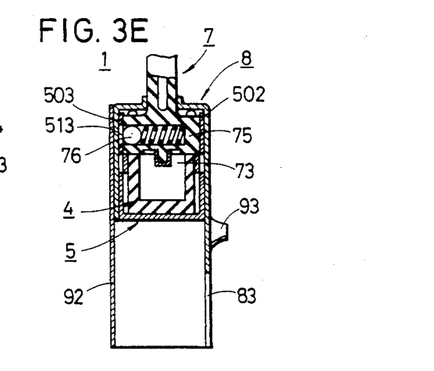

FIGS. 3A to 3E are views of one embodiment of the present invention. In particular, FIG. 3A is a plan view of the same, FIG. 3B is a front view of the same, FIG. 3C is a side view of the same, FIG. 3D is a front view, partially in section, of the same, and FIG. 3E is a sectional side view taken along the line IIIE—IIIE in FIG. 3D. First referring to FIGS. 3A to 3E, the structure of the slide switch 1 included in one embodiment of the present invention will be described. The slide switch 1 mainly comprises a resin case 4, an inner case 5 constituting a shield member, a shield plate 6, an outer case 8, a bent member 9 and a slider 7.

Figure 4A:
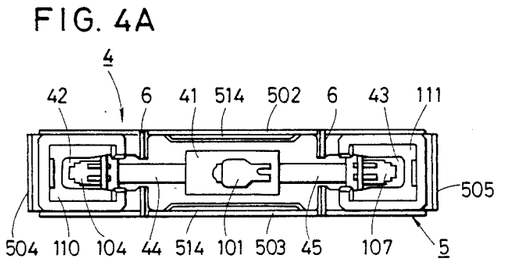
FIGS. 4A to 4D are views of a resin case having an inner case fixed thereto.
Figure 4B:
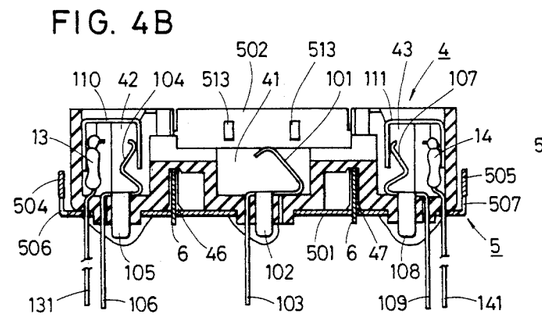
Figure 4C:
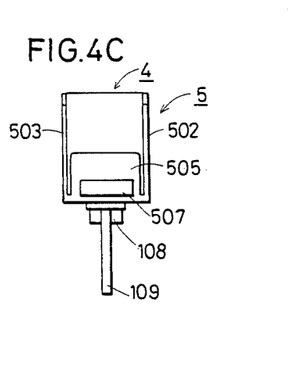
Figure 4D:
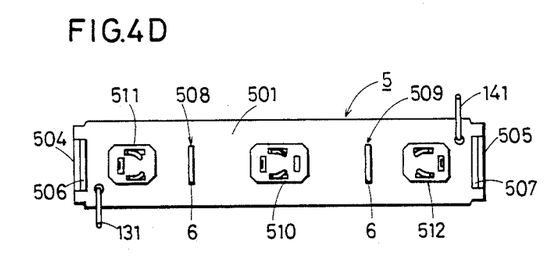

FIGS. 4A to 4D are views showing the resin case having the shield case fixed thereto. In particular, FIG. 4A is a plan view of the same, FIG. 4B is a front view, partially in section, of the same, FIG. 4C is a side view of the same, and FIG. 4D is a bottom view of the same.

Now referring to FIGS. 4A to 4D, the resin case 4 and the inner case 5 will be specifically described. The resin case 4 is made of synthetic resin and is formed with a concave portion 41 for receiving the common contact 101 at the central portion. At opposite sides of the concave portion 41, concave portions 42 and 43 for individually receiving a fixed contact 104 by way of a first contact and a fixed contact 107 by way of a second contact are formed. A groove 44 is formed in the resin case 4 to be continuous to the concave portions 41 and 42 and a groove 45 is also formed in the resin case 4 to be continuous to the concave portions 41 and 43. These grooves 44 and 45 are formed to allow for sliding movement of the movable contact 73 included in a slider 7, to be described subsequently. A groove 46 is formed between the concave portions 41 and 42 for insertion of one shield plate 6 and a groove 47 is formed between the concave portions 41 and 43 for insertion of the other shield plate 6.

The common contact 101 is received in the concave portion 41. The common contact 101 is fixed to the resin case 4 with the fixing portion 102 penetrating through the bottom portion of the resin case 4 and the tip end thereof caulked. The terminal portion 103 of the common contact 101 also extends through and beneath the bottom of the resin case 4. One fixed contact 104 is received in the concave portion 42. The fixed contact 104 is fixed to the resin case with the fixing portion 105 thereof penetrating through the bottom of the resin case 4 and the tip end portion thereof caulked. The terminal portion 106 of the fixed contact 104 also extends through and beneath the bottom of the resin case 4. Furthermore the first terminating contact 110 is received in the concave portion 42. One lead wire of the terminating resistor 13 is connected to the terminating contact 110. The terminating contact 110 is placed in contact with the fixed contact 104 to serve to connect the fixed contact 104 to the terminating resistor 13. The other fixed contact 107 is received in the concave portion 43. The fixed contact 107 is fixed to the resin case 4 with the fixing portion 108 penetrating through the bottom of the concave portion 43 and the tip end thereof caulked. The terminal 109 of the fixed contact 107 also extends through and beneath the bottom of the concave portion 43. Furthermore, the second terminating contact 111 is received in the concave portion 43. One lead wire of the terminating resistor 14 is connected to the terminating contact 111. The terminating contact 111 is placed in contact with the fixed contact 107 to serve to connect the fixed contact 107 to the terminating resistor 14.

Figure 5:
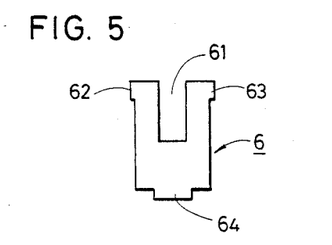
FIG. 5 is a view of a shield plate.

FIG. 5 is a view of the shield plate 6. Two of the shield plates 6 are provided. One shield plate 6 is provided to establish a shield between the common contact 101, the fixed contact 104 and the terminating contact 110, while the other shield plate 6 is provided to establish a shield between the common contact 101, the fixed contact 107 and the terminating contact 111. Although such shield plate 6 can be dispensed with when the distances between the common contact 101 and the fixed contacts 104 and 107 are large, increased distances therebetween make the apparatus large in size and therefore are provided for the purpose of miniaturization. The shield plate 6 is formed with a notch portion 61 than can be fitted to the grooves 46 and 47 formed on the resin case 4. Protruding portions 62 and 63 are engagable with the inner case 5 and are formed at both sides of the shield plate 6 and a claw 64 is formed beneath the same. The respective shield plates 6 are inserted into the grooves 46 and 47 of the resin case 4.

Now referring to FIGS. 4A to 4D, the inner case 5 will be described. The inner case 5 is provided for shielding the bottom and side surfaces of the resin case 4. To that end, the inner case 5 comprises the bottom surface 501, bent portions 502 and 503 extending along both side surfaces of the elongated side of the resin case 4, and bent portions 504 and 505 bent along both side surfaces of the short side of the resin case 4. The bottom surface 501 is formed with apertures 508 and 509 through which respective claws 64 of the shield plates 6 extend an aperture 510 through which the fixing portion 102 and the terminal portion 103 of the common contact 101 extend, an aperture 511 through which the fixing portion 105 and the terminal portion 106 of the fixed contact 104 extend, an aperture 512 through which the fixing portion 108 and the terminal portion 109 of the fixed contact 107 extend, and apertures (unnumbered) through which the other lead wire 131 of the terminating resistor 13 and the other lead wire 141 of the terminating resistor 14 extend. Apertures 506 and 507 in the form of a rectangle are formed on the bent portions 504 and 505. These rectangular apertures 506 and 507 are for insertion of the claw 89 formed on the outer case to be described subsequently. Furthermore, two apertures 513 are formed on the bent portion 502. Likewise, two apertures 513 are formed on the bent portion 503. The apertures 513 formed on the bent portion 503 are provided so that a ball 76 (FIG. 6B) provided on the slider 7 to be described subsequently may be fitted thereinto to serve as a stopper for the slider 7. Furthermore, a protruding portion 514 extending in the sliding direction to be protruded inward is formed on each of the bent portions 502 and 503. The protruding portions 514 are provided for receiving the slider 7.

Figure 6A:
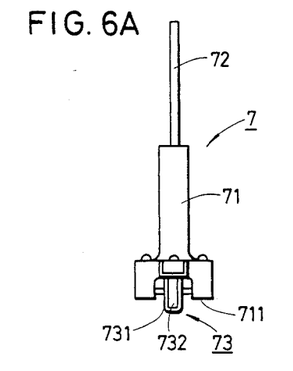
FIGS. 6A and 6B are views of the slider.
Figure 6B:
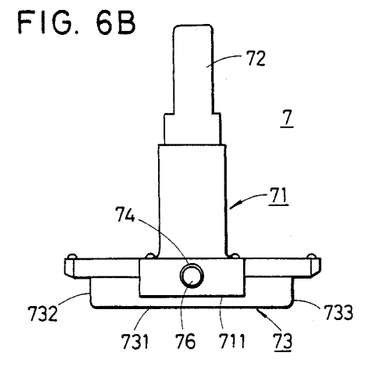

FIGS. 6A and 6B are views of the slider. In particular, FIG. 6A is a side view thereof and FIG. 6B is a front view thereof. The slider 7 shown in FIGS. 6A and 6B is adapted for sliding movement in the resin case 4. The slider 7 comprises a sliding portion 71 made of synthetic resin, a lever 72 made of metal, and a movable contact 73 serving as a conductor formed by bending a thin metallic blank. The sliding portion 71 is formed such that the lower surface 711 thereof is flat, so that the flat portion may be slided on the protruding portions 514 formed on the inner case 5. The movable contact 73 is adapted to slide in the grooves 44 and 45 formed on the resin case 4. The movable contact 73 is adapted such that the lower surface 731 thereof is normally in electrical contact with the common contact 101 while the side surface 732 is placed in pressure contact with the fixed contact 104 when the slider 7 is slided toward one side, whereby the fixed contact 104 and the terminating contact 110 are separated from each other. The other side surface 733 of the movable contact 73 is placed in pressure contact with the fixed contact 107 when the slider 7 is slided toward the other side while the fixed contact 107 and the terminating contact 111 are separated. An aperture 74 is formed on the slide portion 71 so that a coil spring 75 and a ball 76 may be received therein. The ball 76 is pressed toward the bent portion 503 of the inner case 5 by the coil spring 75 (see FIG. 3E), and is fitted into the aperture 513, thereby serving as a stopper.

Figure 7A:
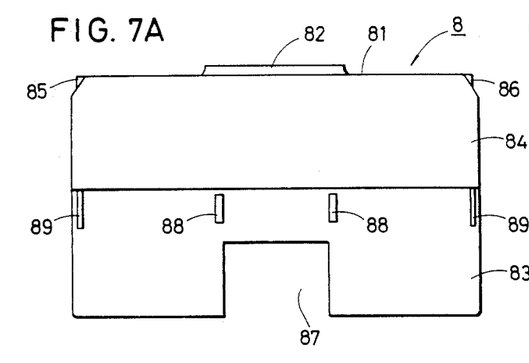
FIGS. 7A and 7B are views of an outer case.
Figure 7B:
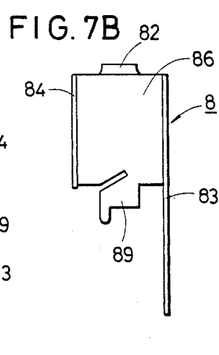

FIGS. 7A and 7B are views of the outer case 8. In particular, FIG. 7A is a front view of the same and FIG. 7B is a side view of the same.

The outer case 8 shown in FIGS. 7A and 7B is provided for covering from above the resin case 4 having the inner case 5 fixed thereto. An elongated aperture 82 is formed on the upper surface 81 of the outer case 8 through which the lever 72 of the slider 7 protrudes. The outer case 8 comprises a bent portion 83 extending along the one side surface of the long side of the resin case 4, a bent portion 84 extending along the other side surface of the long side of the resin case 4, and bent portions 85 and 86 extending along both side surfaces of the short side of the resin case 4. A rectangular notch 87, and two rectangular apertures 88 are formed on the bent portion 83. These apertures 88 are provided to receive a claw 93 of a bent member 9 to be described subsequently. A respective claw 89 is formed protruding downward on each of the bent portions 85 and 86. The claw 89 is inserted into the rectangular apertures 506 and 507 formed on the inner case 5 and the lead wires 131 and 141 of the terminating resistors 13 and 14 are connected to the tip end thereof.

Figure 8A:
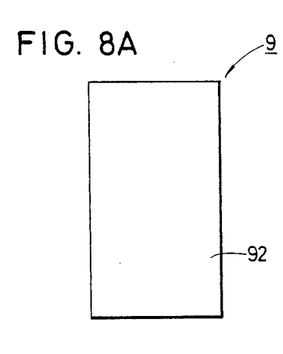
FIGS. 8A and 8B are views of a bent member.
Figure 8B:
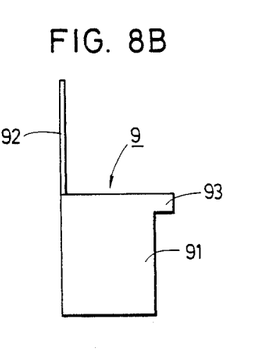

FIGS. 8A and 8B are views of the bent member 9. In particular, FIG. 8A is a front view of the same and FIG. 8B is a side view of the same.

The bent member shown in FIGS. 8A and 8B is provided for establishing a shield between the terminal portion 103 of the common contact 101 protruding downward from the inner case 5, the terminal portion 106 of the fixed contact 104, and the terminal portion 109 of the fixed contact 107. To that end, the bent member 9 comprises a bent portion 91 having an opening on the side of the bent portion 83 of the outer case 8, and a flat portion 92 contiguous to the bent portion 84 of the outer case 8. A claw 93 is formed at the tip end on the side of the outer case 8 of the bent portion 91. The claw 93 is inserted into the aperture 88 of the outer case 8 and is then caulked.

Now referring to FIGS. 3A to 8B, an assembling process of the slide switch will be described. First the inner case 5 is fixed to the resin case 4. This is performed by coating an adhesive agent on the fixing portion 102 and the terminal portion 103 of the common contact 101 penetrating through the inner case 5, the fixing portion 105, and the terminal portion 106 of the fixed contact 104, and the fixing portion 108 and the terminal portion 109 of the fixed contact 107. Then the movable contact 73 of the slider 7 is fitted into the grooves 44 and 45 of the resin case 4. Then the outer case 8 is put on the inner case 5 from above. At that time the lever 72 of the slider 7 is brought to penetrate through the elongated aperture 82 of the outer case 8 while the claws 89 of the bent portions 85 and 86 are inserted into the respective rectangular apertures 506 and 507 of the inner case 5. Then the lead wire 131 of the terminating resistor 13 and the lead wire 141 of the terminating resistor 14 are soldered to the tip ends of the claws 89. Then the claw 93 of the bent member 9 is inserted into the aperture 88 of the outer case 8 and the same is caulked. The boundary portion of the bent portion 93 of the bent member 9 and the bent portion 83 of the outer case 8 is soldered.

By structuring the slide switch in the above described manner, one fixed contact 104 is terminated by the terminated resistor 13 through the terminating contact 110 or the other fixed contact 107 is terminated by the terminating resistor 14 through the terminating contact 111 depending on the position of the slider 7. When the slider 7 is slided toward one side, one side end surface 732 of the movable contact 73 presses the fixed contact 104, whereby the fixed contact 104 and the terminating contact 110 are separated. Accordingly, the common contact 101 is electrically connected to the fixed contact 104 through the movable contact 73. Conversely, when the slider 7 is slided toward the other side, the other side end surface 733 of the movable contact 73 depresses the fixed contact 107, whereby the fixed contact 107 and the terminating contact 111 are separated. Accordingly, the fixed contact 107 comes to be connected to the common contact 101 through the movable contact 73. Since the terminating resistors 13 and 14 are received in the resin case 4 and the same are disposed in the vicinity of the fixed contacts 104 and 107, the lead wires can be shortened and as a result leakage of a signal from the lead wires can be decreased. Furthermore, since the common contact 101 and the fixed contact 104 are shielded by the shield plate 6 while the common contact 101 and the first fixed contact 107 are shielded by the second shield plate 6 and in addition the resin case 4 as a whole is shielded by the inner case 5 and the outer case 8, while the terminal portion 103 of the common contact 101, the terminal portion 106 of the fixed contact 104 and the terminal portion 109 of the fixed contact 107 are shielded by the bent member 9, the shielding effect is excellent. Accordingly, by utilizing the above described slide switch 1 for the purpose of channel selection of the CATV system, a preferred isolation and impedance matching can be attained and the degradation of the picture quality in selection of the cable can be prevented. More specifically, according to the above described embodiment, isolation between the signals of the high frequency as high as 500 MHz can be reduced to 65 dB. Furthermore, the return loss by way of a characteristic exhibiting the impedance matching with respect to a signal of the frequency of 500 MHz could be obtained at a value larger than 10 dB and the return loss with respect to the signal of 1 GHz could be made to be a value slightly lower than 10 dB.

Figure 9A:
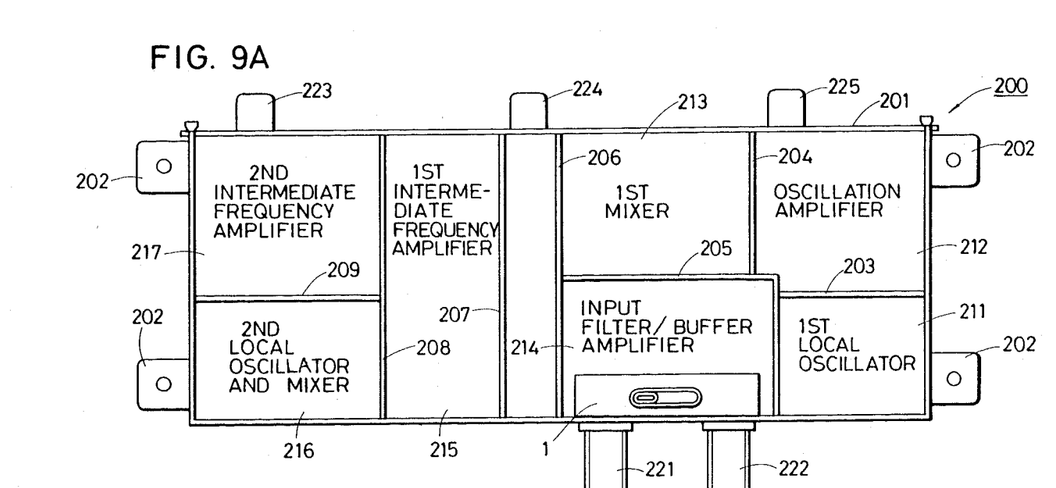
FIGS. 9A and 9B are views of a CATV converter having the slide switch mounted therein included in one embodiment of the present invention.
Figure 9B:
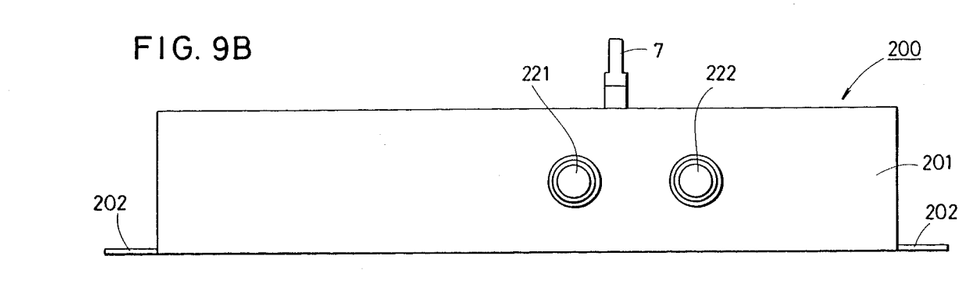

FIGS. 9A and 9B are views of the CATV converter having the slide switch of one embodiment of the present invention fixed thereto. In particular, FIG. 9A is a plan view of the same and FIG. 9B is a front view of the same.

The CATV converter 200 comprises a housing 201 having openings at the upper and lower planes. Both opposing short side surfaces of the housing 201 are provided with respective fixing members 202 for fixing the housing 201 to the box. One of the long side surfaces has connectors 221 and 222 fixed for connecting the coaxial cables 11 and 12, while the other long side surface has a jack 223 for withdrawing an output signal, a jack 224 for supplying a power and another jack 225 fixed thereto.

The housing 201 is partitioned into a plurality of compartments by means of partitions 203 to 209. The respective compartments partitioned by the partitions 203 to 209 are used for receiving base boards 211 to 217, respectively. The base board 211 is provided with a first local oscillator, the base board 212 is provided with an oscillating amplifier, the base board 213 is provided with a first mixer, the base board 214 is provided with an input filter/buffer amplifier, the base board 215 is provided with a first intermediate frequency amplifier, the base board 216 is provided with a second local oscillator and a mixer, and the base board 217 is provided with a second intermediate frequency amplifier. The slide switch 1 is mounted to the base board 214 which is provided with the input filter/buffer amplifier.

Figure 10A:
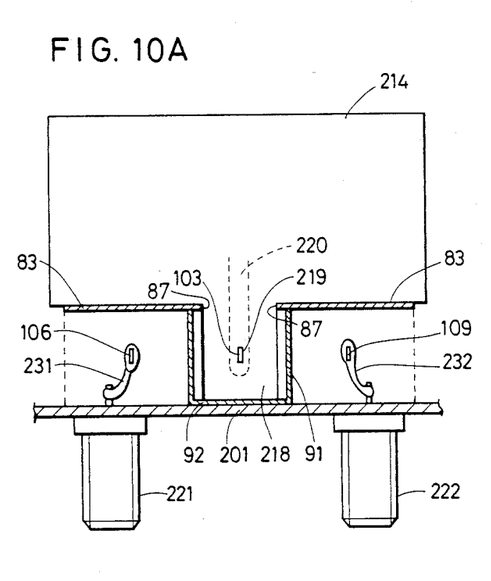
FIGS. 10A and 10B are views, partially fragmentary, showing a fixing structure of the slide switch.
Figure 10B:
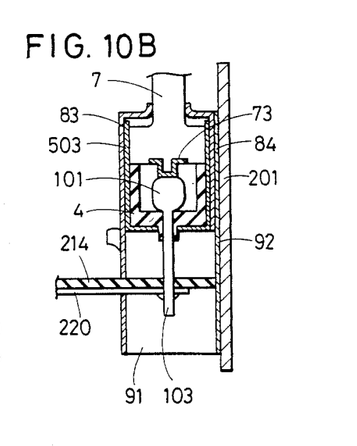

FIGS. 10A and 10B are sectional views showing a fixing structure of the slide switch 1, wherein FIG. 10A is a plan sectional view and FIG. 10B is a side sectional view. Now referring to FIGS. 10A and 10B, the fixing structure of the slide switch 1 will be described. The base board 214 is formed with a protruding portion 218 having both sides notched excluding the central portion on the side contiguous to the housing 201. The protruding portion 218 is used for insertion into a rectangular notch portion 87 (FIG. 7A) formed in the bent portion 83 of the outer case 8 of the slide switch 1. The protruding portion 218 of the base board 214 is formed with an aperture 219 which receives the terminal portion 103 of the common contact 101 of the slide switch 1. A pattern 220 for connecting the terminal portion 103 to the input filter/buffer amplifier is formed on the rear surface of the base board 214 and on the periphery of the aperture 219.

In fixing the slide switch 1 to the base board 214, first the notch portion 87 of the bent portion 83 is inserted over the protruding portion 218 so that the terminal portion 103 may be inserted into the aperture 219 from above the protruding portion 218 of the base board 214. At that time it is adapted such that the flat plate portion 92 of the bent member 9 may be in contact with the inner wall of the side surface of the housing 201. Then the flat portion 92 of the bent member 9 and the inner wall of the side surface of the housing 201 are soldered and the slide switch 1 is fixed to the housing 201. Then the terminal portion 103 and the pattern 220 are soldered. Then the terminal of the connector 221 and the terminal portion 106 of the fixed contact 104 are connected by the lead wire 231 and the terminal of the connector 222 and the terminal portion 109 of the fixed contact 107 are connected by the lead wire 232. Depending on a case, the terminal of the connector and the terminal portion of the respective contact may be directly soldered without using a lead wire.

By thus fixing the slide switch 1 to the base board 214 in the housing 201, the terminal portion 103 of the common contact 101, the terminal portion 106 of the fixed contact 104 and the terminal portion 109 of the fixed contact 107 can be completely shielded by the bent portion 83 of the outer case 8 and the bent portion 91 of the bent member 9, respectively. By disposing the connectors 221 and 222 close to the terminal portions 106 and 109, respectively, the lengths of the lead wires 231 and 232 can be shortened and depending on a situation the same can be dispensed with. Accordingly, leakage of a high frequency signal from the lead wires 231 and 232 can be decreased or can be eliminated. Furthermore, by fixing the slide switch 1 in the housing 201, it becomes unnecessary to externally provide a switch as done conventionally and hence it is possible to dispense with wiring work for connecting the coaxial cables 11 and 12 to the switch.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A CATV system comprising:
   (A) first and second lines, one end of each of said lines being coupled to a central unit for transmitting information from said central unit to a terminal unit; and
   (B) a selecting switch for selecting one of said first and second lines for supplying information to said terminal unit, said selecting switch comprising:
      (1) a shield case, said shield case including a resin case and a case member made up of a conductive material, said case member including an outer case and an inner case covering said resin case;
      (2) shield plate means for partitioning the interior defined by said shield case into three compartments, a middle compartment, a first compartment adjacent to one side of said middle compartment, and a second compartment adjacent to the other side of said middle compartment;
      (3) a slider provided in said shield case and slidable between a first position wherein said slider extends into said first compartment and a second position wherein said slider extends into said second compartment, said slider being located at least partially in said middle compartment both when it is in said first position and when it is in said second position;
      (4) a common contact connected to said terminal unit and housed in said middle compartment and normally placed in electrical contact with said slider;
      (5) a first fixed contact housed in said first compartment and connected to said first line and placed in electrical contact with said slider and electrically connected to said common contact when said slider is in said first position;
      (6) a first terminating contact housed in said first compartment and placed in electrical contact with said first fixed contact when said slider is placed in said second position; said first terminating contact being separated from said first fixed contact when said slider is placed in said first position;
      (7) a first terminating resistor housed in said first compartment and having one end thereof connected to said shield case and the other end thereof directly connected to said first terminating contact for terminating said first line when said slider is placed in said second position;
      (8) a second fixed contact housed in the second compartment and connected to said second line and being placed in electrical contact with said slider and electrically connected to said common contact when said slider is placed in said second position;
      (9) a second terminating contact housed in said second compartment and placed in electrical contact with said second fixed contact when said slider is placed in said first position and being separated from said second fixed contact when said slider is placed in said second position; and
      (10) a second terminating resistor housed in said second compartment and having one end thereof connected to said shield case and the other end thereof directly connected to said second terminating contact for terminating said second line when said slider is placed in said first position.

2. A CATV system in accordance with claim 1, wherein said resin case includes said first, second and middle compartments and wherein said shield plate means includes first and second shield plates located between said first and middle compartments and said second and middle compartments, respectively.

3. A CATV system in accordance with claim 2, wherein
   said resin case comprises a groove for permitting sliding movement of said slider.

4. A CATV system in accordance with claim 1, wherein
   (A) said inner case comprises:
      (1) first and second bent portions formed at opposite end portions of said inner case; and
      (2) first and second apertures formed in said first and second bent portions, respectively; and
   (B) said outer case comprises:
      (1) a first claw formed on one side surface of said outer case and extending into said first aperture of said inner case; and
      (2) a second claw formed on an opposite side surface of said outer case and extending into said second aperture of said inner case.

5. A CATV system in accordance with claim 4, wherein
   said first terminating resistor is connected to said first claw, and
   said second terminating resistor is connected to said second claw.

6. A CATV system in accordance with claim 1, wherein
   each said first and second lines each comprises a coaxial cable having a characteristic impedance of 75Ω; and
   each of said first and second terminating resistors has a resistance value of 75Ω.

7. A CATV system in accordance with claim 1, wherein
   said terminal unit comprises a CATV converter having two connectors for receiving respective input signals from said first and second lines, respectively, and for converting the frequency of the signal transmitted from said central unit; and
   said selecting switch is located in said CATV converter.

8. A CATV system in accordance with claim 7, wherein
   said CATV converter comprises:
      a housing; and
      a circuit board housed in said housing;
   said circuit board including a protruding portion having a notch formed therein for receiving said common contact; and
   wherein said outer case of said selecting switch includes a portion enclosing said protruding portion and said notch of said CATV converter.

9. A CATV system in accordance with claim 8, wherein
   said protruding portion extends to but is spaced from said housing; and
   said portion of said outer case enclosing said protruding portion is located between said protruding portion and said housing and is in contact with said housing.

* * * * *